US008265464B2

(12) United States Patent
McLean

(10) Patent No.: US 8,265,464 B2
(45) Date of Patent: Sep. 11, 2012

(54) ADMINISTERING A TIME-SHIFTING CACHE IN A MEDIA PLAYBACK DEVICE

(75) Inventor: James G. McLean, Fuquay-Varina, NC (US)

(73) Assignee: International Business Machines Corporation, Armonk, NY (US)

(*) Notice: Subject to any disclaimer, the term of this patent is extended or adjusted under 35 U.S.C. 154(b) by 737 days.

(21) Appl. No.: 12/393,165

(22) Filed: Feb. 26, 2009

(65) Prior Publication Data

US 2010/0215336 A1 Aug. 26, 2010

(51) Int. Cl.
*H04N 5/783* (2006.01)

(52) U.S. Cl. ............. 386/350; 386/343; 725/1; 725/32; 725/58; 725/81; 725/133; 725/141; 725/153; 358/908; 348/700; 348/701; 348/702

(58) Field of Classification Search ............... 386/1, 68, 386/45, 46, 343, 35, 123, 125, 126; 725/58, 725/1, 32, 81, 133, 141, 153; 358/908; 348/700–702

See application file for complete search history.

(56) References Cited

U.S. PATENT DOCUMENTS

| 7,155,734 | B1 | 12/2006 | Shimomura et al. | |
|---|---|---|---|---|
| 7,224,731 | B2 | 5/2007 | Mehrotra | |
| 7,272,295 | B1 | 9/2007 | Christopher | |
| 2003/0018980 | A1 | 1/2003 | Gorbatov et al. | |
| 2003/0031455 | A1* | 2/2003 | Sagar | 386/35 |
| 2007/0055979 | A1 | 3/2007 | Van Gassel et al. | |
| 2007/0250597 | A1 | 10/2007 | Resner et al. | |
| 2010/0005494 | A1* | 1/2010 | McLean | 725/58 |
| 2010/0122277 | A1* | 5/2010 | Fonseca | 725/10 |
| 2011/0040981 | A1* | 2/2011 | Lindahl et al. | 713/189 |
| 2011/0142411 | A1* | 6/2011 | Camp | 386/228 |

* cited by examiner

*Primary Examiner* — Jeffrey Pwu
*Assistant Examiner* — Hee Song
(74) *Attorney, Agent, or Firm* — Brandon C. Kennedy; Cynthia G. Seal; Biggers & Ohanian, LLP

(57) ABSTRACT

Methods, apparatus and products for administering a time-shifting cache in a media playback device are disclosed, where the media playback device receives from a digital media provider a digital media stream of digital media content and administering the time-shifting cache includes caching the digital media content of the digital media stream in the time-shifting cache; dynamically identifying one or more non-preferred segments of the cached digital media content; and managing the time-shifting cache in dependence upon the identified non-preferred segments.

15 Claims, 7 Drawing Sheets

ADMINISTERING A TIME-SHIFTING CACHE IN A MEDIA PLAYBACK DEVICE

BACKGROUND OF THE INVENTION

1. Field of the Invention

The field of the invention is data processing, or, more specifically, methods, apparatus, and products for administering a time-shifting cache in a media playback device.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computers today are often incorporated in various devices found in the home as well as the office including devices that playback digital media content, such as, for example, televisions, digital video recorders, digital cable set-top-boxes, portable satellite radio players, and the like. Such devices may be used to playback content of digital media streams, such as satellite television, satellite radio, digital cable, and the like. Such devices may also be configured to store such streamed content in a time-shifting cache, a buffer of recently received digital media content, accessible by a user for playback. A user may rewind, pause, or fast forward playback of cached content all while the media device continues to cache current content. In some devices the time-shifting cache is limited to a particular size, while in other devices the only limitation of size of the time-shifting cache is the size of the storage medium upon which the cache is stored. As the size of the cache increases, less room is available for more current information and more processing overhead is required to navigate playback within the cache. In many cases the digital media content that is stored in the time-shifting cache includes many of uninteresting, or non-essential, content with respect to a user's primary interest in playing back the content. Commercials, silent portions of a radio broadcast, musical interludes between news programs, and the like are portions of cached content which occupies space in a time-shifting cache of limited size and increases processing overhead to navigate playback of the cached material.

SUMMARY OF THE INVENTION

Methods, apparatus and products for administering a time-shifting cache in a media playback device are disclosed, where the media playback device receives from a digital media provider a digital media stream of digital media content and administering the time-shifting cache includes caching the digital media content of the digital media stream in the time-shifting cache; dynamically identifying one or more non-preferred segments of the cached digital media content; and managing the time-shifting cache in dependence upon the identified non-preferred segments.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
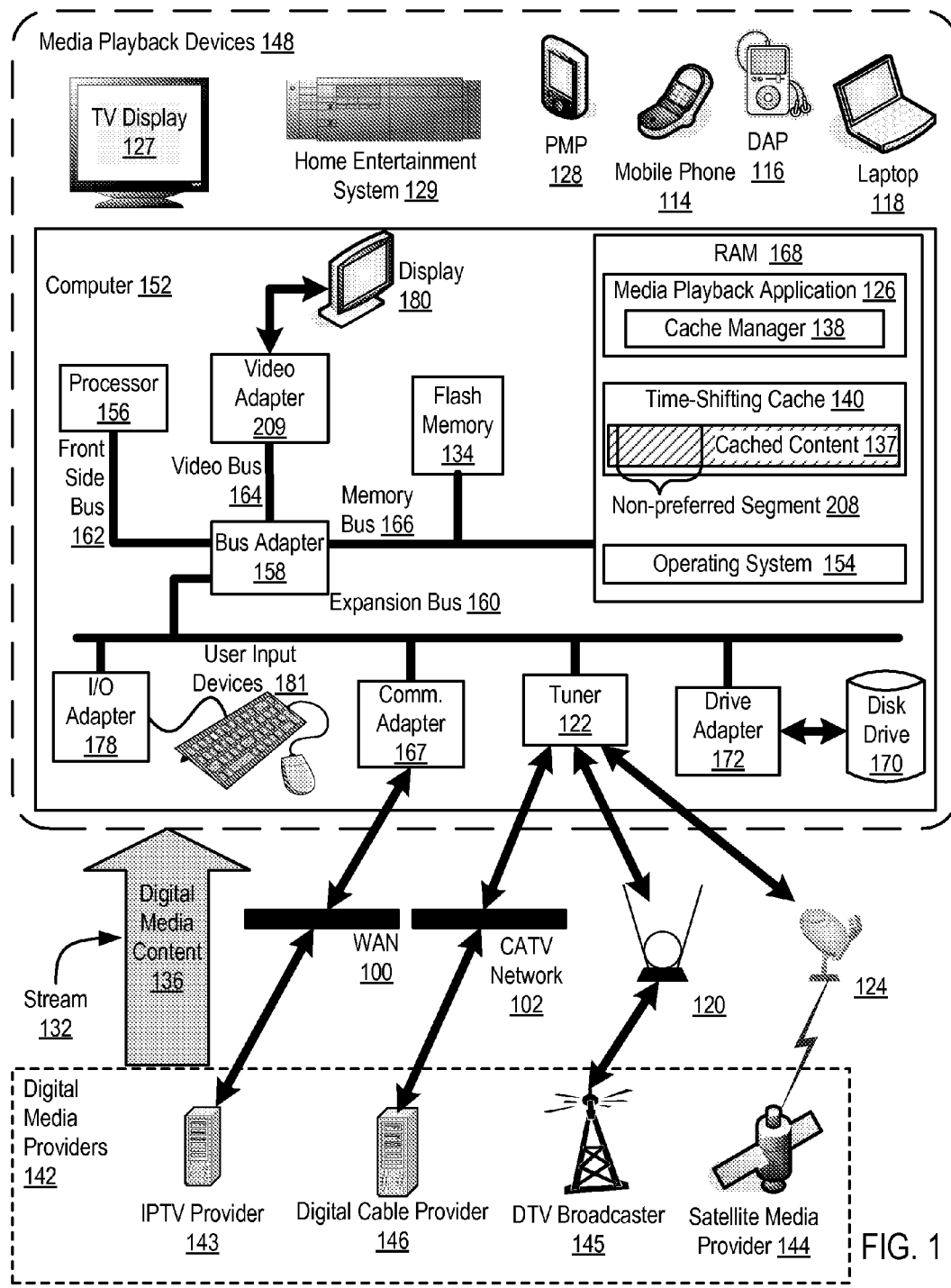
FIG. 1 sets forth a network diagram of an exemplary system for administering a time-shifting cache in a media playback device according to embodiments of the present invention.

Exemplary methods, apparatus, and products for administering a time-shifting cache in a media playback device in accordance with the present invention are described with reference to the accompanying drawings, beginning with FIG. 1. FIG. 1 sets forth a network diagram of an exemplary system for administering a time-shifting cache in a media playback device according to embodiments of the present invention.

A media playback device is an aggregation of computer hardware and software capable of administering digital media streams according to embodiments of the present invention. The system of FIG. 1 includes several example media playback devices (148) including the television display (127), home entertainment system (129), portable media player ('PMP') (128), mobile phone (114), digital audio player ('DAP') (116), laptop (118), and computer (152). Other example media playback devices not shown in the system of FIG. 1 include: stand-alone personal video recorders ('PVRs') also called digital video recorders ('DVRs'), cable or satellite subscription PVRs, car audio playback systems, home audio playback systems, mobile satellite radio players, satellite radio players integrated into home theater systems, digital audio recorders integrated into wi-fi enabled devices, satellite connected devices, or digital radio receivers, and other as will occur to readers of skill in the art. In the system of FIG. 1, each media playback device (148) is capable of receiving a digital media stream from one of a number of digital media providers (142).

A digital media stream is digital media content (136) that is delivered to a media playback device during playback or display of the content. Digital media content may include digital audio content, digital video content, or a combination of digital audio and video content. Because content may include both audio and video content, the terms 'displaying' and 'playback' as used in this specification may refer to displaying video on a display device, such as a computer monitor or a television, or playing audio through an audio playback device, that is, speakers or headphones. In some embodiments audio content may be 'displayed,' that is, played, through speakers installed in a computer monitor or television.

A digital media provider (142) is an entity that provides a digital media stream (132) to media playback devices, where the digital media stream (132) includes digital audio or video content. Examples of digital media providers (142) in the system of FIG. 1 include:

- an Internet Protocol Television ('IPTV') provider (143) that transmits audio and video content to media playback devices through a wide area network ('WAN') (100);
- a digital cable provider (146) that transmits digital cable to a tuner (122) of a media playback device through a cable television ('CATV') network (102);
- a Digital Television ('DTV') broadcaster (145) that transmits digital television from a broadcasting antenna to an antenna (120) connected to a tuner (122) of a media playback device; and
- a satellite media provider (144) that transmits audio and video content through satellites in orbit around the earth to a satellite dish receiver (124) connected to a tuner (122) of a media playback device.

IPTV is a system in which a digital television service is delivered using Internet Protocol ('IP') over a network infrastructure, which may include delivery by a broadband connection. IPTV may be thought of as television content that, instead of being delivered through traditional broadcast and cable formats, is delivered through the technologies used for computer networks. IPTV may be transmitted over the public Internet through a wide area network (100) or through a closed network infrastructure as described below with respect to a digital cable provider.

Satellite media providers (144) may transmit digital media streams to digital media playback devices through systems of satellite transmitters and receivers. Such digital media streams may include television content, a combination of digital audio and video. Examples of satellite providers that transmit digital media streams including television content include Echostar™ and DirecTV™. Other digital media streams transmitted by satellite providers may include audio content. Examples of satellite providers that transmit digital media streams including audio content include Sirius™ satellite radio and XM™ satellite radio.

Digital television broadcasters may transmit digital television media streams to media playback devices in according to a digital television format. One common format used is the ATSC ('Advanced Television Systems Committee') format which enables Radio Frequency ('RF') transmission of DTV. According to the ATSC format, content of multiple channels may be multiplexed and transmitted in an MPEG transport stream 'over-the-air' that is, as an RF transmission.

Digital cable providers (146), such as Cox Communications™, Time Warner Cable™, and the like, may transmit digital cable content in a digital media stream to a media playback device (148) in a variety of ways. A digital cable provider, for example, may transmit digital cable content to a media playback device over a closed network infrastructure, not the public Internet, as an IPTV stream. Digital cable providers (146) may also provide other services to users in addition to digital cable television content such as digital telephone services, Voice over IP ('VOIP'), and internet services.

The computer (152) of FIG. 1, an example media playback device (148), includes at least one computer processor (156) or 'CPU' as well as random access memory (168) ('RAM') which is connected through a high speed memory bus (166) and bus adapter (158) to processor (156) and to other components of the computer (152). Stored in RAM (168) is a media playback application (126), a set of computer program instructions that causes the computer (152) to operate as a media playback device. The example media playback application (126) includes a cache manager, a module of computer program instructions that administers the time-shifting cache (140) in the media playback device (148), the computer (152), according to embodiments of the present invention by caching the digital media content (136) of the digital media stream (132) in the time-shifting cache (202); dynamically identifying one or more non-preferred segments (208) of the cached digital media content (137); and managing the time-shifting cache (202) in dependence upon the identified non-preferred segments (208).

Time-shifting refers generally to the recording of content to a storage medium to be played back at a time more convenient to a user. Time-shifting typically refers to the act of storing full copies of television content, radio content, movies, and the like for playback hours, days, weeks, or even months after the original broadcast or transmission of the digital media content. In this specification, however, the term 'time-shifting' is used to describe a cache. A time-shifting cache (140) is a buffer, typically of limited size, in which digital media content (136) is stored as it received and the oldest stored content is evicted from the cache when the cache is full. Consider, as an example of a time-shifting cache of limited size a cache that is capable of storing only 30 minutes of the most recent digital television content received form a digital television broadcaster (145). A user may, in real time, playback cached content (137) stored in the time-shifting cache, while the cache continually, in real-time, stores currently received content and evicts all content older than 30 minutes. The term 'time-shifting' as used here to describe a cache, then, generally refers to a more convenient time for a user to playback cached digital media content (137) in terms of seconds, minutes, or hours. Readers of skill in the art will recognize although time-shifting caches may be limited in size, that limit may not be implemented as a hard limit, but instead, the size of the time-shifting cache may be elastic. A user, for example, may playback content stored 29 minutes ago in a time-shifting cache limited to 30 minutes of programming, then pause the playback for three minutes. In this example the cache may be designed to increase the size of the buffer while playback is paused. In the example computer (152) of FIG. 1, the cache manager (138) stores the digital media content (136) of a digital media stream (132) in a time-shifting cache (140) in RAM (168). The time-shifting cache (140) of FIG. 1 is depicted in RAM for purposes of explanation only, not limitation. In some embodiments, the time-shifting cache (140) may be implemented in other storage mediums, such as flash memory (134) or the disk drive (170).

As mentioned above, the cache manager (138) in the example of FIG. 1, in addition to caching the content (136) of the digital media stream (132) in the time-shifting cache, also identifies non-preferred segments (208) of the cached content (137) and manages the time-shifting cache (140) in dependence upon the identified non-preferred segments (208). A 'non-preferred' segment of digital media content is a portion of content that may be removed from playback of the content without a user noticing, or in fact, with the user's approval. Examples of non-preferred segments which may be removed without notice or even with approval by a user may include audio segments that do not include human speech in a news program, silent portions of radio broadcast, commercial advertisements in television or radio programs, a recurring interstitial audio pattern repeated between songs on a satellite radio broadcast, and so on as will occur to readers of skill in the art. In some cases, a 'non-preferred' segment may be a portion of content that is so small that removal of the segment would be completely imperceptible to a human—short audio slices or short video slices, for example.

In addition to the media playback application (126), cache manager (138), and the time-shifting cache, also stored in RAM (168) is an operating system (154). Operating systems useful for administering digital media streams according to embodiments of the present invention include UNIX™, Linux™, Microsoft XP™, Microsoft Vista™, AIX™, IBM's i5/OS™, and others as will occur to those of skill in the art. The operating system (154), media display device application (126), buffers (130), and media stream (132), in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that operate as media playback devices for administering a time-shifting cache according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100), other media display devices (148), and digital media providers (142). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for administering a time-shifting cache in a media playback device according to embodiments of the present invention include modems for wired dial-up communications, Ethernet (IEEE 802.3) adapters for wired data communications network communications, and 802.11 adapters for wireless data communications network communications.

The arrangement of servers, computers, digital media providers, networks, media playback devices, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
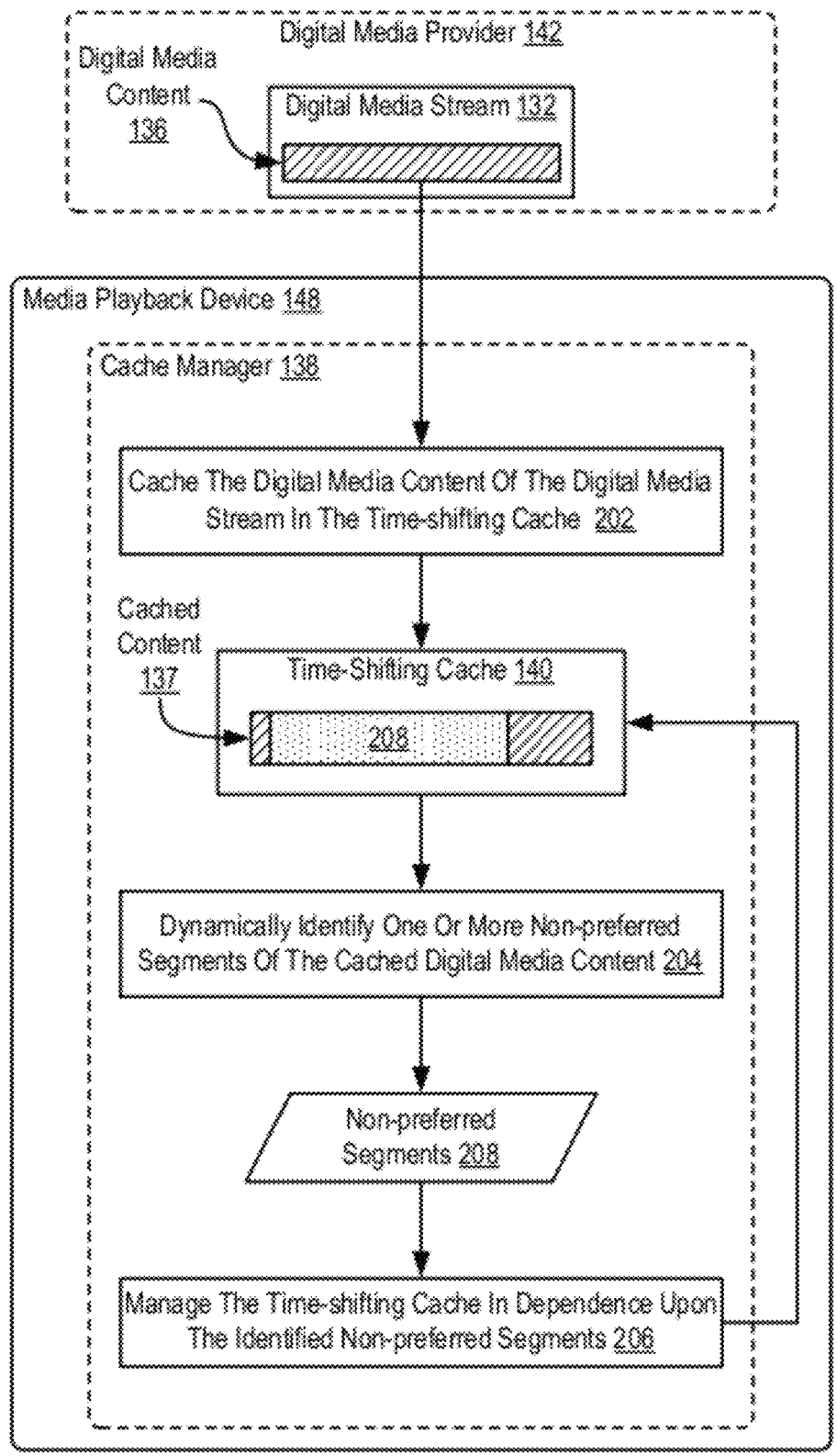
FIG. 2 sets forth a flow chart illustrating an exemplary method for administering a time-shifting cache in a media playback device according to embodiments of the present invention.

For further explanation, FIG. 2 sets forth a flow chart illustrating an exemplary method for administering a time-shifting cache in a media playback device according to embodiments of the present invention. In the method of FIG. 1, the example media playback device (148) receives from a digital media provider (142) a digital media stream (132) that includes digital media content (136).

The method of FIG. 2 includes caching (202) the digital media content (136) of the digital media stream (132) in the time-shifting cache (202). Caching (202) the digital media content (136) in the time-shifting cache (202) may include demultiplexing a plurality of channels broadcast in the multichannel digital media stream (132). A 'channel,' as the term is used in this specification, represents a unique stream of content within a digital media stream. One digital media stream may include many channels, that is, many unique streams of content. Consider, as an example, a digital, satellite radio stream in which audio content of 10 different channels is received by a media display device. Each channel represents one of 10 unique streams of content within the digital, satellite radio stream. Demultiplexing the channels extracts the channels from the media stream such that content of the channels may be cached and played back. In some embodiments caching the content also includes decoding the content through use of a codec. A codec is a device or program capable of encoding or decoding a digital data stream or signal. The word codec may be a combination of any of the following: 'compressor-decompressor,' 'coder-decoder,' or 'compression/decompression algorithm.' Decoded content of a channel typically has a larger memory footprint than original encoded content, however, and as such, buffers used to caching such decoded content may be larger than those used to cache encoded content.

The method of FIG. 2 also includes dynamically identifying (204) one or more non-preferred segments (208) of the cached digital media content (137). Identifying (204) non-preferred segments (208) is said to be carried out 'dynamically' in that the cache manager (138) identifies non-segments automatically and continuously, in real-time or near-real-time, without human intervention or interaction while flushing the cache of stale content and storing current content. Identifying (204) non-preferred segments (208) may include storing beginning and end locations of the non-preferred segments of the cached digital media content (137). Such locations may be implemented as playback positions, time stamps, pointers to memory locations, digital codes embedded within the content itself, and so on as will occur to readers of skill in the art.

The method of FIG. 2 also includes managing (206) the time-shifting cache (202) in dependence upon the identified non-preferred segments (208). Managing (206) the time-shifting cache (202) may include for example, managing playback of cached content, deleting or otherwise modifying cached content, and other management actions as described in detail below with respect to FIGS. 3 and 4.

Figure 3:
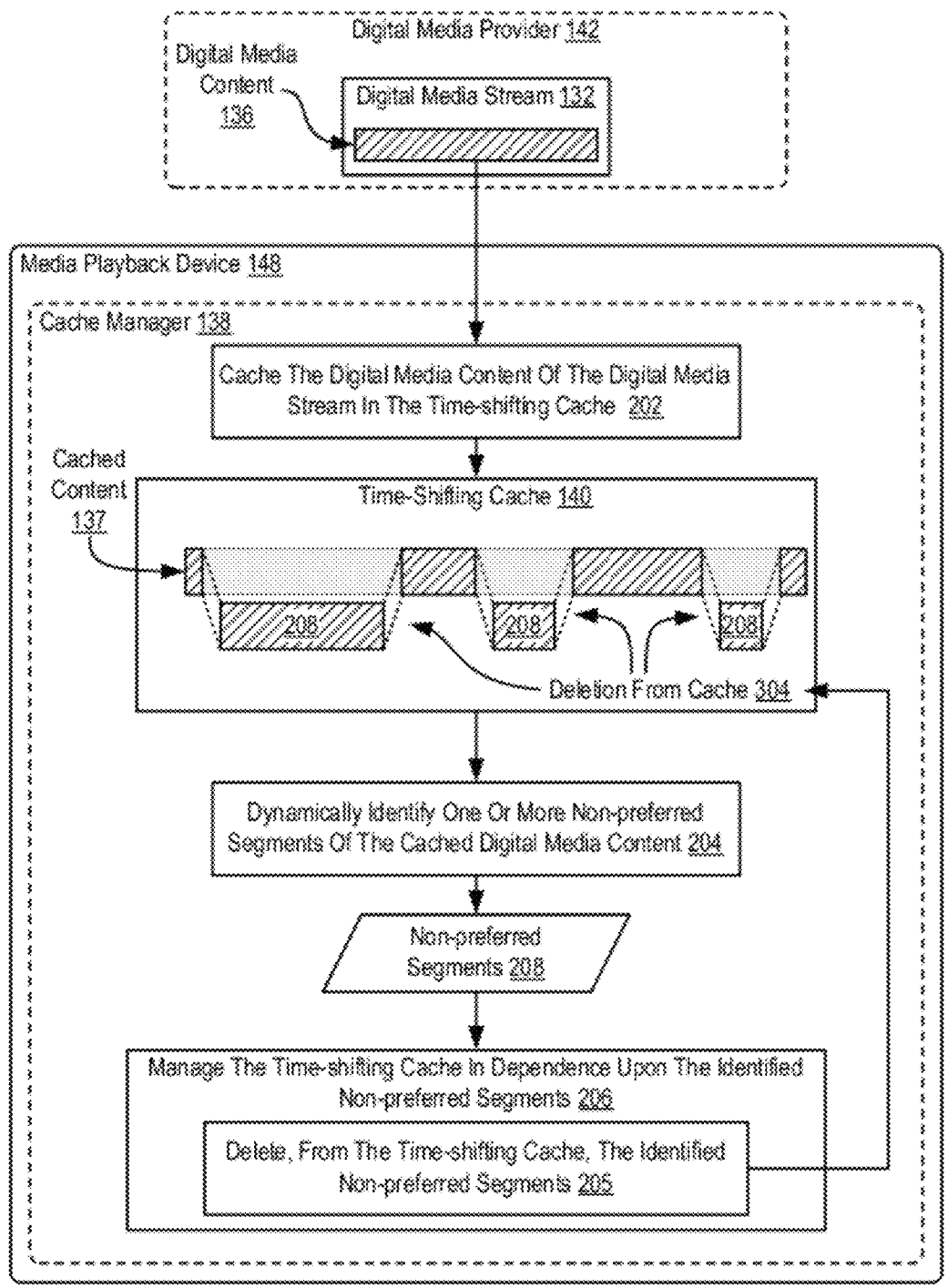
FIG. 3 sets forth a flow chart illustrating a further exemplary method for administering a time-shifting cache in a media playback device according to embodiments of the present invention.

For further explanation, FIG. 3 sets forth a flow chart illustrating a further exemplary method for administering a time-shifting cache in a media playback device according to embodiments of the present invention. The method of FIG. 3 is similar to the method of FIG. 2 in the method of FIG. 3, the media playback device (148) receives from a digital media provider (142) a digital media stream (132) that includes digital media content (136), and the method of FIG. 3 includes the cache manager's (138) caching (202) the digital media content (136) of the digital media stream (132) in the time-shifting cache (202); dynamically identifying (204) one or more non-preferred segments (208) of the cached digital media content (137); and managing (206) the time-shifting cache (202) in dependence upon the identified non-preferred segments (208).

The method of FIG. 3 differs from the method of FIG. 2, however, in that in the method of FIG. 3, managing (206) the time-shifting cache (202) in dependence upon the identified non-preferred segments (208) is carried out by deleting (205), from the time-shifting cache (140), the identified non-preferred segments (208). Deleting (205) the identified non-preferred segments (208) may be carried out periodically, upon identification of a predefined number of non-preferred segments, upon caching content greater than a predefined threshold, or at other times as will occur to readers of skill in the art. In the method of FIG. 3, the deletion (304) from cache of three non-preferred segments (208) is depicted as a removal from the cached content (137) of the three non-preferred segments (208). The remaining cached content, immediately after deletion (304) of the non-preferred segments, is smaller in size than immediately before the deletion and contains only content characterized as a preferred, that is, content in which a user is likely to have interest in playing back.

Figure 4:
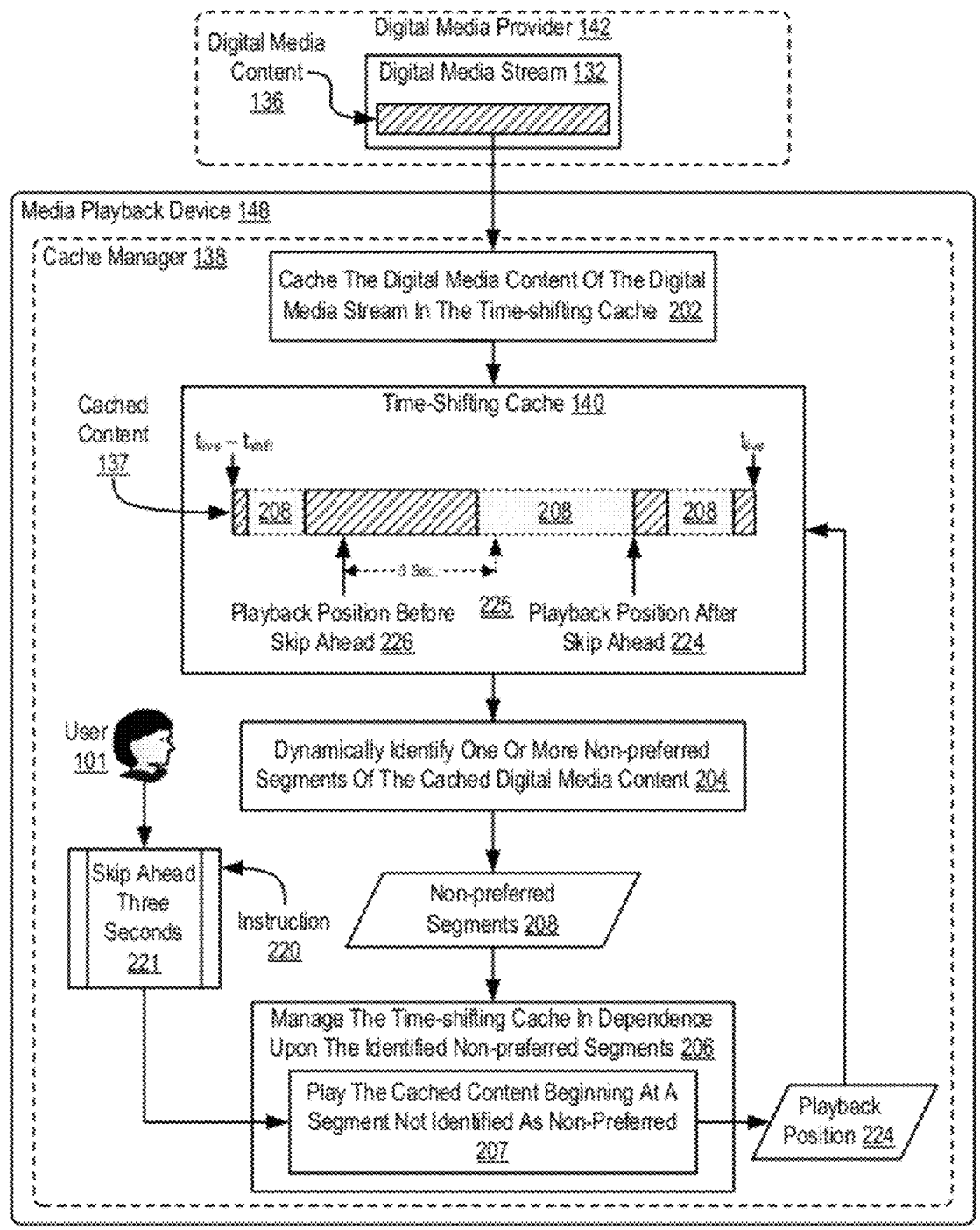
FIG. 4 sets forth a flow chart illustrating a further exemplary method for administering a time-shifting cache in a media playback device according to embodiments of the present invention.

For further explanation, FIG. 4 sets forth a flow chart illustrating a further exemplary method for administering a time-shifting cache in a media playback device according to embodiments of the present invention. The method of FIG. 4 is similar to the method of FIG. 2 in the method of FIG. 4, the media playback device (148) receives from a digital media provider (142) a digital media stream (132) that includes digital media content (136), and the method of FIG. 4 includes the cache manager's (138) caching (202) the digital media content (136) of the digital media stream (132) in the time-shifting cache (202); dynamically identifying (204) one or more non-preferred segments (208) of the cached digital media content (137); and managing (206) the time-shifting cache (202) in dependence upon the identified non-preferred segments (208).

The method of FIG. 4 differs from the method of FIG. 2, however, in that in the method of FIG. 4 managing (206) the time-shifting cache (202) in dependence upon the identified non-preferred segments (208) is carried out by playing (207) the cached content (137) beginning at a segment not identified as non-preferred, responsive to a user (100) instruction (220) to playback cached content (207). Playing (207) the cached content (137) beginning at a segment not identified as non-preferred may be carried out by determining a playback position (224) beginning at a preferred segment. A playback position (224) in the example of FIG. 4 is specification of a time relative to the current time, depicted here as $t_{live}$, from which the media playback device begins playback of the cached content. In the example of FIG. 4, the time-shifting cache includes a particular amount of time of digital content represented here as $t_{shift}$, where $t_{shift}$ may specify the amount of time that has passed since the cache manager began caching the content or the maximum amount of time which may be stored in the cache. The expression, $t_{live}$-$t_{shift}$, specifies a particular time relative to the current time and the time-shift, $t_{shift}$. Consider for further explanation, an example time-shifting cache that is configured to store a maximum of the most recent 30 minutes of digital television broadcasting. When the cache manager begins caching the digital television broadcast, at 9:30:02 for example, $t_{live}$-$t_{shift}$ is 9:30:02 and remains as such until thirty minutes of the digital television broadcasting is stored in the cache, that is, when the current time, $t_{live}$, is 10:00:02. At that time $t_{shift}$ remains constant at 30 minutes and $t_{live}$-$t_{shift}$ varies continuously with the current time—when $t_{live}$ is 10:01:02, $t_{live}$-$t_{shift}$ is 9:31:02; when $t_{live}$ is 10:15:02, $t_{live}$-$t_{shift}$ is 9:45:02; when $t_{live}$ is 11:25:33, $t_{live}$-$t_{shift}$ is 10:55:33; and so on. A playback position as described here specifies a particular time between $t_{live}$ and $t_{live}$-$t_{shift}$. Consider for example that $t_{live}$-$t_{shift}$ is 9:30:00 and $t_{live}$ is 10:00:00. A playback position may specify any time between 9:30:00 and 10:00:00, such as, 9:45:00, for example.

As mentioned above, playing the cached content beginning at a segment not identified as non-preferred is carried our responsive to a user instruction (220). In the method of FIG. 4, the user (101) instructs the media playback device and thereby the cache manager (138), to skip ahead three seconds (221) in playback of the cached content. The current playback position (226) before receiving the instruction to skip ahead three seconds (221) is within a preferred segment, a segment not identified as non-preferred. Instead of skipping ahead exactly three seconds from the playback position (226), which would begin playback within a non-preferred segment (208), the cache manager determines a playback position (224) beginning at the next available preferred segment after the typical playback position (225). The example instruction to skip three seconds ahead is described here for clarity of explanation only, not limitation. Readers of skill in the art will immediately recognize many other types of user instructions that may be carried out in accordance with this method of administering a time-shifting cache in a media playback device in accordance with embodiments of the present invention.

Figure 5:
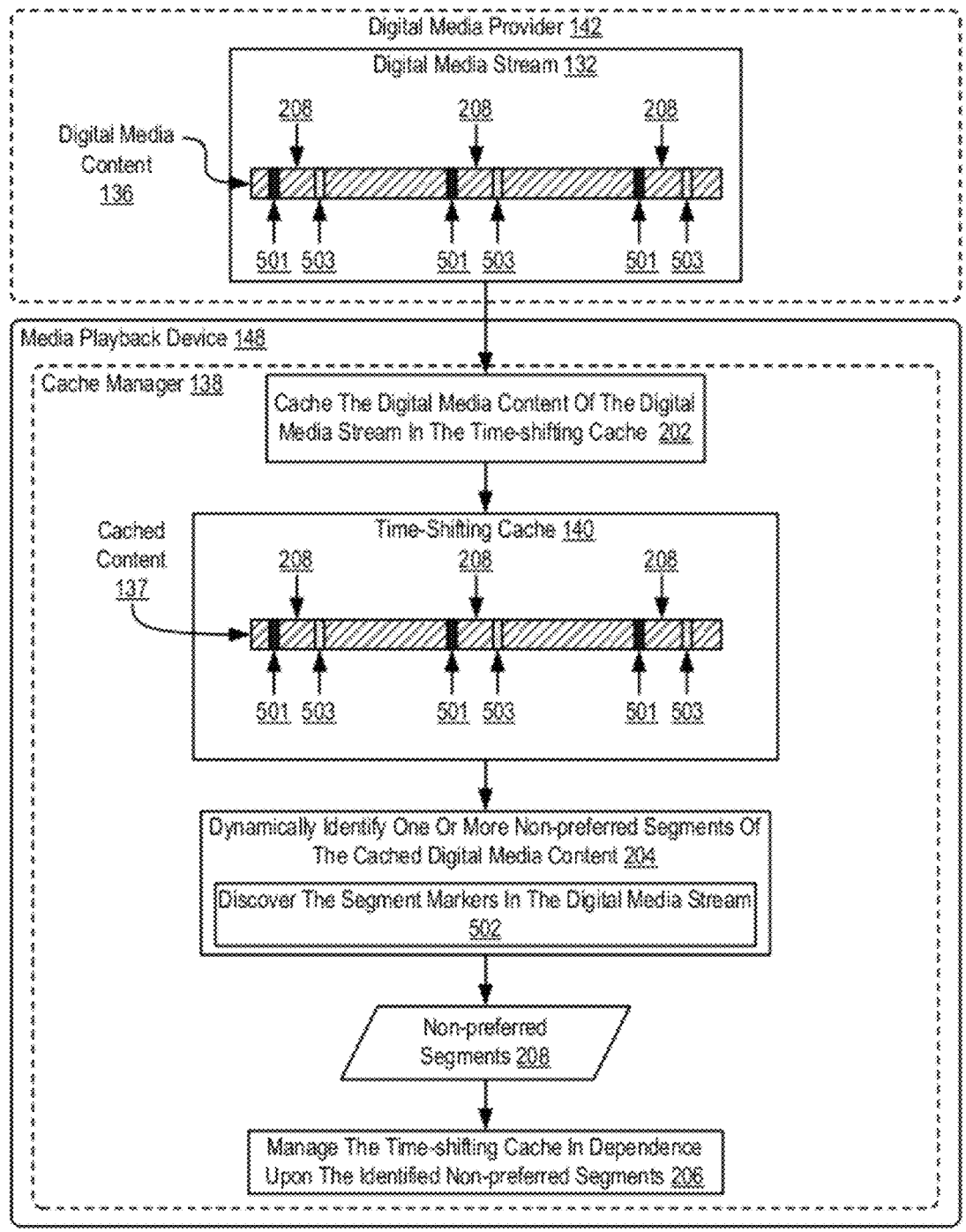
FIG. 5 sets forth a flow chart illustrating a further exemplary method for administering a time-shifting cache in a media playback device according to embodiments of the present invention.

For further explanation, FIG. 5 sets forth a flow chart illustrating a further exemplary method for administering a time-shifting cache in a media playback device according to embodiments of the present invention. The method of FIG. 5 is similar to the method of FIG. 2 in the method of FIG. 5, the media playback device (148) receives from a digital media provider (142) a digital media stream (132) that includes digital media content (136), and the method of FIG. 5 includes the cache manager's (138) caching (202) the digital media content (136) of the digital media stream (132) in the time-shifting cache (202); dynamically identifying (204) one or more non-preferred segments (208) of the cached digital media content (137); and managing (206) the time-shifting cache (202) in dependence upon the identified non-preferred segments (208).

The method of FIG. 5 differs from the method of FIG. 2, however, in that in the method of FIG. 5 the digital media stream (132) further comprises one or more segment markers (501, 503), where the segment markers (501, 503) indicate non-preferred segments (208) of the digital media content (136). A marker may identify a beginning or end location of a segment of content. A marker is sent along with or embedded in the digital media content of the media stream for the sole purpose of identifying a beginning location of a segment of content. A marker does not affect playback as such except for cache management operations. Such a marker may be implemented as a particular digital code embedded in the content of the digital media stream that indicates the beginning or end of a segment of the content, a pointer sent along with the digital media stream that points to a particular time, frame, or other location in the content of the channel, or pointer that identifies beginning location and a size of the segment.

Identifying (204) one or more non-preferred segments (208) of the cached digital media content (137) in the method of FIG. 5 includes discovering (502) the segment markers (501, 503) in the digital media stream. Discovering (502) the segment markers (501, 503) in the digital media stream may be carried out in various ways in dependence upon the implementation of the markers. One way in which discovering (502) the segment markers (501, 503) in the digital media stream may be carried out is by finding in the digital media stream a digital code representing a beginning location (501) and a second digital code representing an end location (503) of a segment.

Figure 6:
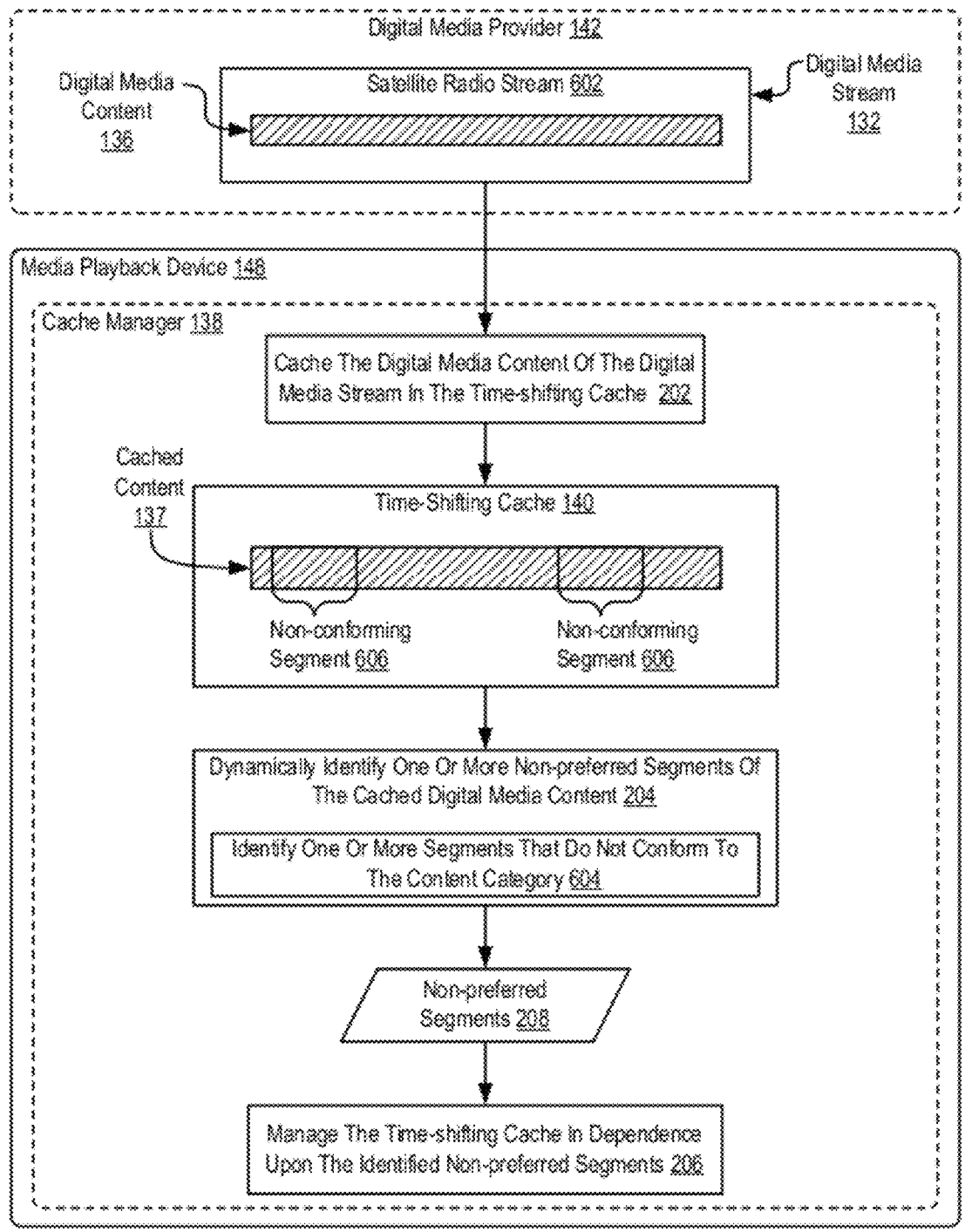
FIG. 6 sets forth a flow chart illustrating a further exemplary method for administering a time-shifting cache in a media playback device according to embodiments of the present invention.

For further explanation, FIG. 6 sets forth a flow chart illustrating a further exemplary method for administering a time-shifting cache in a media playback device according to embodiments of the present invention. The method of FIG. 6 is similar to the method of FIG. 2 in the method of FIG. 6, the media playback device (148) receives from a digital media provider (142) a digital media stream (132) that includes digital media content (136), and the method of FIG. 6 includes the cache manager's (138) caching (202) the digital media content (136) of the digital media stream (132) in the time-shifting cache (202); dynamically identifying (204) one or more non-preferred segments (208) of the cached digital media content (137); and managing (206) the time-shifting cache (202) in dependence upon the identified non-preferred segments (208).

The method of FIG. 6 differs from the method of FIG. 5, however, in the method of FIG. 6 the digital media stream (132) is characterized by a content category (602). A content category (602) is a specification of a type of digital media content in a digital media stream. Such content categories may define the media stream at a very high granularity or a very low granularity. Examples of such content categories include: television broadcasting stream, movie stream, news stream, sports stream, situational comedy stream, satellite radio stream, music stream, photo slideshow stream, and so on. In the method of FIG. 6, for example, the digital media stream (132) is characterized as a satellite radio stream. The preferred content of such a stream may include individual songs, while the non-preferred content of a satellite radio stream may include video-only interstitials, commercial advertisements, recurring audio interstitials that are not individual songs, segments of silence and so on as will occur to readers of skill in the art.

Identifying (204) one or more non-preferred segments (208) of the cached digital media content (137) in the method of FIG. 6 includes identifying (604) one or more segments (606) that do not conform to the content category (602). Identifying (604) one or more segments (606) that do not conform to the content category (602) may be carried out differently for each different content category. Identifying (604) one or more segments (606) that do not conform to the content category (602) of digital television, as one example, may be carried out by identifying segments that represent commercial advertisements, segments of silence, digital audio with no change in digital video, and so on. In the method of FIG. 6, where the digital media stream (132) is characterized by a content category of satellite radio (602), for example, identifying (604) one or more segments (606) that do not conform to the content category (602) may be carried out by identifying segments that are not individual songs.

Figure 7:
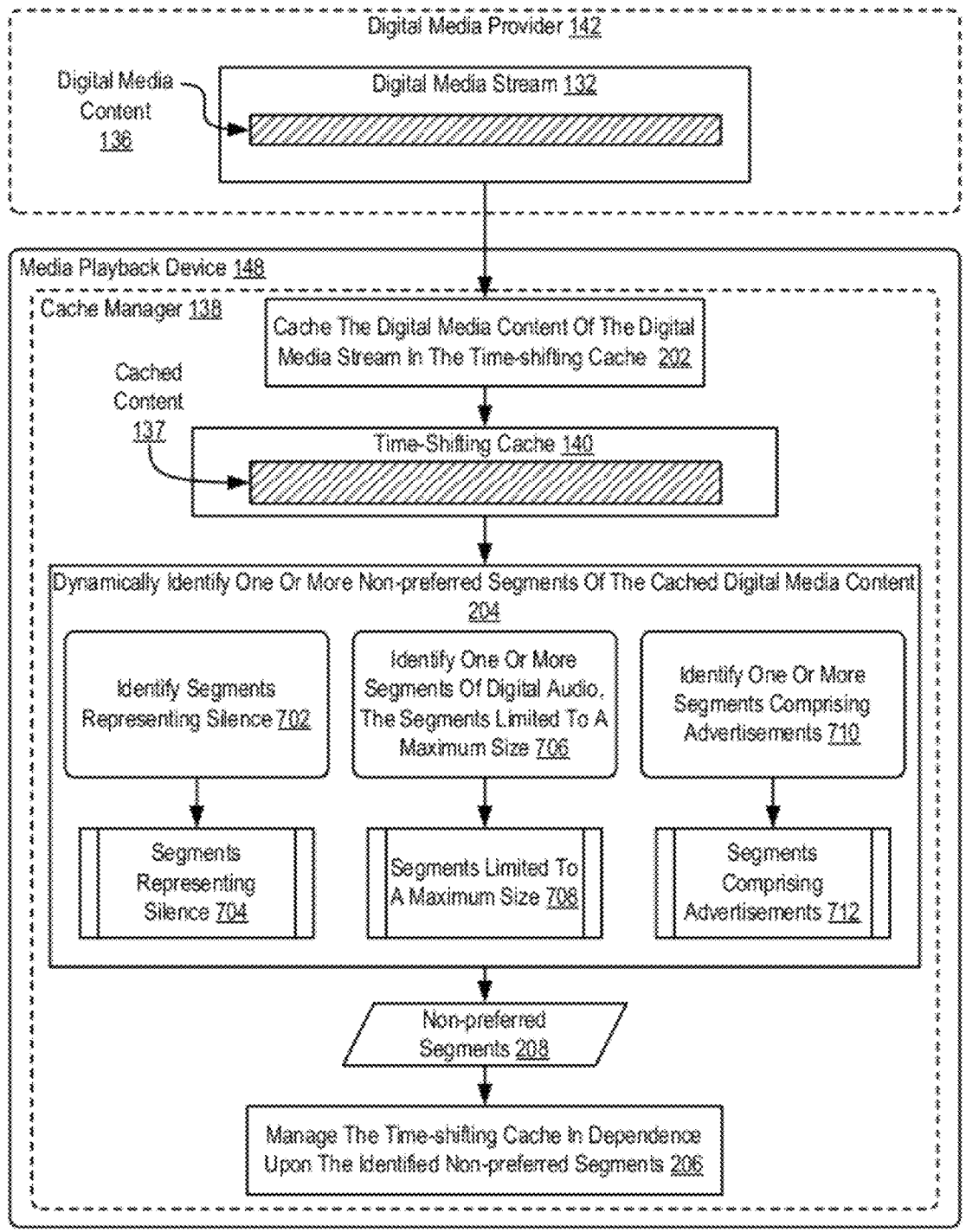
FIG. 7 sets forth a flow chart illustrating a further exemplary method for administering a time-shifting cache in a media playback device according to embodiments of the present invention.

For further explanation, FIG. 7 sets forth a flow chart illustrating a further exemplary method for administering a time-shifting cache in a media playback device according to embodiments of the present invention. The method of FIG. 7 is similar to the method of FIG. 2 in the method of FIG. 7, the media playback device (148) receives from a digital media provider (142) a digital media stream (132) that includes digital media content (136), and the method of FIG. 7 includes the cache manager's (138) caching (202) the digital media content (136) of the digital media stream (132) in the time-shifting cache (202); dynamically identifying (204) one or more non-preferred segments (208) of the cached digital media content (137); and managing (206) the time-shifting cache (202) in dependence upon the identified non-preferred segments (208).

The method of FIG. 7 differs from the method of FIG. 2, however, in that in the method of FIG. 7 includes several alterative ways of dynamically identifying (204) one or more non-preferred segments (208) of the cached digital media content (137). One way of identifying (204) one or more non-preferred segments (208) in the method of FIG. 7 is identifying (702) segments representing silence (704). Identifying (702) segments representing silence (704) may be carried out by identifying segments of digital audio in which the gain, or volume, of the audio is below a predetermined threshold, or identifying segments of a mixed media stream, audio and video, in which there is only digital video, no digital audio. In many digital media streams, silence is a non-preferred portion of the digital media content. In television, music, or radio streams for example, segments of silence, especially segments of silence with no corresponding digital video, are the typically considered non-preferred segments.

Another way of identifying (204) one or more non-preferred segments (208) in the method of FIG. 7 includes identifying (706) one or more segments of digital audio where the segments limited to a maximum size (708). The maximum size limiting the identified segments of digital audio is specified such that removing the identified segments of digital audio from the cached digital media content is imperceptible to a human ear during playback of the cached digital media content of the digital media stream. Removing relatively small segments of audio from a television broadcast, for example, so small that a viewing user is unaware of the removal, reduces the size of the cache and removes content which a viewer typically does not prefer to playback.

Another way of identifying (204) one or more non-preferred segments (208) in the method of FIG. 7 includes identifying (710) one or more segments of advertisements (712). Identifying (710) one or more segments of advertisements (712) may be carried out in various ways known to readers of skill in the art including, for example, by identifying a first and second segment of 'empty' or black frames of digital video that correspond to first and second particular segment of silent digital audio. Typically inserted between a segment of a television program and a segment of commercial advertisements, for example, is a short segment of silence and a segment of black video. Then, inserted between the segment of the commercial advertisements and a subsequent segment of the television program is another a short segment of silence and a segment of black video. In such an embodiment, the cache manager in identifying one or more non-preferred segments, may identify as one or more segments of advertisements, the segment bookended by the short segments of silence and black video.

Readers of skill in the art will recognize that these are but a few example methods of administering a time-shifting cache in a media playback device in accordance with embodiments of the present invention. Other techniques, methods, technology, devices, software, and hardware than those described in this specification may be used to implement the methods described above, and each such embodiment is well within the scope of the present invention.

Exemplary embodiments of the present invention are described largely in the context of a fully functional computer system for administering a time-shifting cache in a media playback device. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering a time-shifting cache in a media playback device, the media playback device receiving from a digital media provider a digital media stream comprising digital media content, the method comprising:
    caching the digital media content of the digital media stream in the time-shifting cache;
    dynamically identifying one or more non-preferred segments of the cached digital media content, including identifying one or more segments of digital audio, the segments limited to a maximum size, the maximum size limiting the identified segments of digital audio so that removing the identified segments of digital audio from the cached digital media content is imperceptible to a human ear during playback of the cached digital media content of the digital media stream; and
    managing the time-shifting cache in dependence upon the identified non-preferred segments, deleting, from the time-shifting cache, the identified non-preferred segments.

2. The method of claim 1 wherein managing the time-shifting cache in dependence upon the identified non-preferred segments further comprises:
    responsive to a user instruction to playback cached content, playing the cached content beginning at a segment not identified as non-preferred.

3. The method of claim 1 wherein:
    the digital media stream further comprises one or more segment markers, the segment markers indicating non-preferred segments of the digital media content; and
    dynamically identifying one or more non-preferred segments of the cached digital media content includes discovering the segment markers in the digital media stream.

4. The method of claim 1 wherein:
    the digital media stream is characterized by a content category; and
    dynamically identifying one or more non-preferred segments of the cached digital media content includes identifying one or more segments that do not conform to the content category.

5. The method of claim 1 wherein dynamically identifying one or more non-preferred segments of the cached digital media content further comprises identifying segments representing silence.

6. The method of claim 1 wherein dynamically identifying one or more non-preferred segments of the cached digital media content further comprises:
    identifying one or more segments comprising advertisements.

7. An apparatus for administering a time-shifting cache in a media playback device, the media playback device receiving from a digital media provider a digital media stream comprising digital media content, the apparatus comprising a computer processor, a computer memory operatively coupled to the computer processor, the computer memory having disposed within it computer program instructions capable of:
    caching the digital media content of the digital media stream in the time-shifting cache;
    dynamically identifying one or more non-preferred segments of the cached digital media content, including identifying one or more segments of digital audio, the segments limited to a maximum size, the maximum size limiting the identified segments of digital audio so that removing the identified segments of digital audio from the cached digital media content is imperceptible to a human ear during playback of the cached digital media content of the digital media stream; and
    managing the time-shifting cache in dependence upon the identified non-preferred segments, deleting, from the time-shifting cache, the identified non-preferred segments.

8. The apparatus of claim 7 wherein managing the time-shifting cache in dependence upon the identified non-preferred segments further comprises:
    responsive to a user instruction to playback cached content, playing the cached content beginning at a segment not identified as non-preferred.

9. The apparatus of claim 7 wherein:
the digital media stream further comprises one or more segment markers, the segment markers indicating non-preferred segments of the digital media content; and
dynamically identifying one or more non-preferred segments of the cached digital media content includes discovering the segment markers in the digital media stream.

10. The apparatus of claim 7 wherein:
the digital media stream is characterized by a content category; and
dynamically identifying one or more non-preferred segments of the cached digital media content includes identifying one or more segments that do not conform to the content category.

11. The apparatus of claim 7 wherein dynamically identifying one or more non-preferred segments of the cached digital media content further comprises identifying segments representing silence.

12. A computer program product for administering a time-shifting cache in a media playback device, the media playback device receiving from a digital media provider a digital media stream comprising digital media content, the computer program product disposed in a non-transmission computer readable recording medium, the computer program product comprising computer program instructions capable of:
caching the digital media content of the digital media stream in the time-shifting cache;
dynamically identifying one or more non-preferred segments of the cached digital media content, including identifying one or more segments of digital audio, the segments limited to a maximum size, the maximum size limiting the identified segments of digital audio so that removing the identified segments of digital audio from the cached digital media content is imperceptible to a human ear during playback of the cached digital media content of the digital media stream; and
managing the time-shifting cache in dependence upon the identified non-preferred segments, deleting, from the time-shifting cache, the identified non-preferred segments.

13. The computer program product of claim 12 wherein managing the time-shifting cache in dependence upon the identified non-preferred segments further comprises:
responsive to a user instruction to playback cached content, playing the cached content beginning at a segment not identified as non-preferred.

14. The computer program product of claim 12 wherein:
the digital media stream further comprises one or more segment markers, the segment markers indicating non-preferred segments of the digital media content; and
dynamically identifying one or more non-preferred segments of the cached digital media content includes discovering the segment markers in the digital media stream.

15. The computer program product of claim 12 wherein:
the digital media stream is characterized by a content category; and
dynamically identifying one or more non-preferred segments of the cached digital media content includes identifying one or more segments that do not conform to the content category.

* * * * *